United States Patent Office 3,131,161
Patented Apr. 28, 1964

3,131,161
SILICONE RUBBER CONTAINING AN EPOXIDE COMPOUND
Siegfried Nitzsche and Manfred Wick, Burghausen, Bavaria, Germany, assignors to Wacker-Chemie G.m.b.H., Bavaria, Germany
No Drawing. Filed Feb. 13, 1961, Ser. No. 88,625
Claims priority, application Germany Feb. 25, 1960
7 Claims. (Cl. 260—37)

This invention relates to silicone rubber having improved physical properties and particularly improved tear strength.

Silicone rubbers are elastomeric materials based on diorganosiloxane polymers. Silicone rubber materials of various qualities and properties have been available for some years. The first silicone rubbers offered in the market place were elastomeric materials exhibiting relatively poor physical properties. However, continued research and development have resulted in significant improvements in the tensile strength, compression set, and elongation properties of silicone rubber.

Despite the great improvements in silicone rubber, it is widely recognized that the widespread use of these materials was being impeded by their relatively poor tear strength. It is, therefore the object of this invention to introduce a silicone rubber stock which is curable to form a rubber of improved tear strength. Other objects and advantages of this invention are detailed in or will be apparent from the disclosure and claims.

This invention comprises a silicone rubber stock curable to form elastomers consisting essentially of 100 parts by weight of a linear, essentially diorganosiloxane polymer, an inorganic reinforcing filler with a particle size of less than 1 micron and a surface area of at least 100 square meters per gram and 0.5 to 20 parts by weight of an epoxide compound.

The siloxane polymers employed herein are linear polymers of the unit formula $$R_nSiO_{\frac{4-n}{2}}$$

where each R is a monovalent radical selected from hydrocarbon and halogeno hydrocarbon radicals and $n$ has an average value of 1.99 to 2.01. These polymers are essentially diorganosiloxanes of unit formula $R_2SiO$ but can contain limited quantities (i.e., less than 2 mol percent) of $RSiO_{3/2}$ units and $R_3SiO_{1/2}$ units as well as trace amounts of $SiO_{4/2}$ units. The units in the polymers can be of a single type such as a homopolymer of dimethylsiloxane units or they can be different as in a copolymer of dimethylsiloxane-, phenylmethylsiloxane- and vinyldimethylsiloxane units. The operative polymers vary from syrupy liquids (viscosity 50,000 cs. at 25° C.) to gumlike materials of several million centistokes viscosity. Polymers having a viscosity of at least 500,000 cs. at 25° C. are preferred. In the siloxanes, the organic substituents represented by R can be alkyl radicals such as methyl, ethyl, propyl, butyl and octadecyl; aryl radicals such as phenyl, diphenyl and anthracyl; alkaryl radicals such as tolyl, xylyl, ethylphenyl and methylnaphthyl; aralkyl radicals such as benzyl and phenylethyl; cycloaliphatic radicals such as cyclohexyl and cyclopentyl; alkenyl radicals such as vinyl, allyl and octadecenyl, beta-cyanoethyl radicals and halogenated derivatives of the foregoing such as chloromethyl, fluoroethyl, idopropyl, bromophenyl, chlorobromophenyl, difluorophenyl, bromophenylethyl, trifluorovinyl, perfluoropropyl, α,α,α-trifluoromethylphenyl and 3,3,3-trifluoropropyl as well as $F_{2x+1}C_xCH_2CH_2$— where $x$ is an integer below 10. It is preferred that at least 50 percent of the organic substituents present be methyl radicals.

The fillers employed herein are inorganic materials having an average particle size of 1 micron or less and a surface area of at least 100 square meters per gram. The preferred fillers are reinforcing silicas such as fume silicas, silica aerogels, silica xerogels, precipitated silicas and naturally occurring silicas having the required particle characteristics. Other operative filters are found among oxides of aluminum, titanium and iron as well as carbon blacks. The fillers are employed in amounts ranging from 10 to 200 parts filler per 100 parts siloxane polymer and the preferred proportions are 20 to 100 parts filler on the stated basis.

The epoxide compositions employed can be any of the commercially available low molecular weight hydroxyl containing epoxide resins or epoxide varnish raw materials. Examples of such materials are compounds of the formula

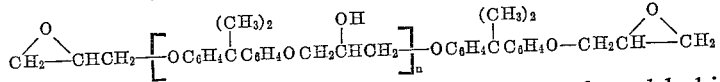

where $n$ is 1 to 12. Reaction products of a polyhydric phenol and a polyfunctional epichlorohydrin or a polyepoxide are operable herein. Such materials are fully described in U.S. patent application Serial No. 481,967, filed January 14, 1955, as well as in U.S. Patents 2,-615,007 and 2,615,008. Also operative are ethers having epoxide groups in the molecule such as allyl glycidyl ether, phenyl glycidyl ether and vinyl glycidyl ether.

Particularly useful herein are organosilicon compounds having epoxide groups in the molecule. Such materials are disclosed in application Serial No. 747,579, filed July 10, 1958, now abandoned, and in Canadian Patent No. 580,908, issued August 4, 1959. These materials are silanes of the formula $A_bR'_cSiX_{4-b-c}$ and siloxanes containing units of the formula $$A_fR'_gSiO_{\frac{4-f-g}{2}}$$

wherein A is an organic radical bonded to silicon by C—Si linkage and containing one or two

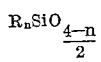

groups, the remaining atoms in A being C, H, carbon bonded halogen and/or oxygen in the form of ether linkages or hydroxyl groups, R' is H or a monovalent radical selected from hydrocarbon and halohydrocarbon radicals, X is —OH or a monovalent hydrocarbonoxy or halohydrocarbonoxy radical, $b$ is 1, 2, 3 or 4, $c$, is 0, 1, 2 or 3, $f$ is 1, 2 or 3, and $g$ is 0, 1 or 2. Specific examples of such materials are:

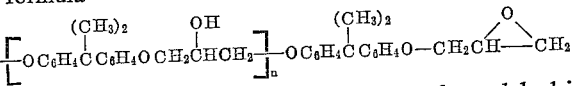

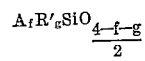

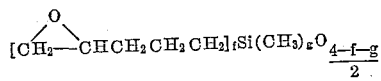

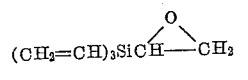

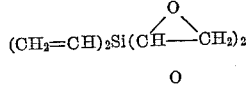

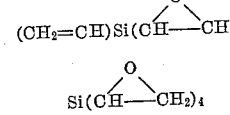

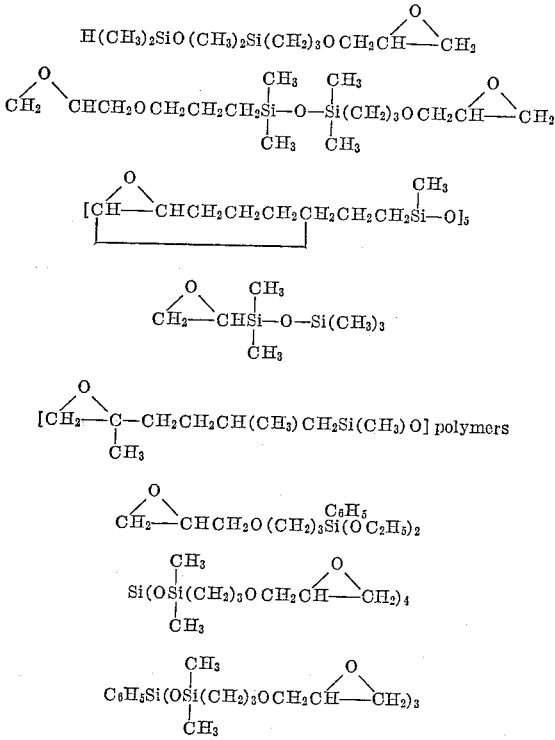

and so forth.

The epoxide compound is employed in amounts of from 0.5 to 20 parts by weight epoxide compound per 100 parts by weight of siloxane polymer. Generally less than 10 parts by weight epoxide compound will produce the desired tear strength.

The siloxane polymer, filler and epoxide compound are thoroughly mixed on a mill or by any other desired means. The order of addition is optional.

In addition to the required ingredients outlined above, the vulcanizing agent is added to secure the desired cure. The well-known organic peroxides serve as vulcanizing agents when added in proportions of 0.5 to 10 parts by weight based on 100 parts of siloxane polymers in the stock. The stock is then treated to activate the peroxide. Operable organic peroxides include benzoyl peroxide, 2,4-dichlorobenzoyl peroxide, dicumyl peroxide, tert-butyl cumyl peroxide, di-tert butyl peroxide, tert-butyl perbenzoate and dicumyl peroxide are particularly useful herein. Another method for vulcanizing and curing the rubber stocks as disclosed in application Serial No. 602,081, filed August 3, 1956, U.S. Patent No. 2,927,907 and U.S. Patent No. 2,843,555, comprises adding to the rubber stock an alkylorthosilicate, alkyl polysilicate or alkylhydrogensiloxane and a monocarboxylic acid salt of lead, tin, nickel, cobalt, iron, cadmium, chromium, zinc, manganese, zirconium, antimony, barium, calcium, titanium and bismuth, as further disclosed in Australian Patent No. 216,878.

In addition to the materials noted above, the rubber stocks can contain additives widely employed in silicone rubber such as non-reinforcing fillers, aging inhibitors, pigments, compression set additives, crepe aging retardants, oxidation inhibitors, and so forth.

The silicone rubbers of this invention are useful in the applications widely known for silicone rubber such as gasketing, tubing, sealing, extrusions, moldings, prosthetic devices, sheeting, insulation and so forth. The materials of this invention can be stored over a period of months and remain readily millable and otherwise workable. A minimum of crepe aging occurs in these stocks even though reinforcing fillers are employed. These elastomeric compositions exhibit tear strengths greatly exceeding the tear strengths of standard silicone rubbers.

The following examples are included to aid those skilled in the art in understanding and practicing this invention. All parts and percentages in the examples are based on weight unless otherwise specified.

*Example 1*

A mixture was prepared by milling together 100 parts of a linear, hydroxyl endblocked diorganosiloxane having 7.5 mol percent phenylmethylsiloxane units, 0.2 mol percent vinylmethylsiloxane units and 92.3 mol percent dimethylsiloxane, and having an average molecular weight of about 500,000, 40 parts reinforcing fume silica, 10 parts wet-process silica (available commercially as HiSil X 303), 5 parts of a commercial epoxide resin prepared by reacting allyl glycidyl ether with bis-phenol-A, having an epoxy value of 0.48 to 0.57 and an average molecular weight of 38°, and 1.2 parts dichlorobenzoyl peroxide. The mixture was milled for about 30 minutes then stored. After four weeks' storage the mixture was readily milled and could be sheeted, extruded or handled in any desired manner after two minutes' milling. A sheet of the mixture was vulcanized by heating at 155° C. for ten minutes to produce an elastomer with tensile strength at break of 80 kg./cm., elongation at break of 475% and a tear strength of 60 kg./cm. measured according to the test method ASTM D624–44, employing Die B specimens. A control sample prepared, stored and vulcanized precisely as described above but without the epoxide resin, was found to have a softening time of 15 minutes on a mill after four weeks' storage and when vulcanized had a tear strength of only 10 kg./cm. Thus the rubber of this invention had a tear strength six times as great as the conventional rubber.

*Example 2*

A mixture of 100 parts trimethylsiloxy endblocked diorganosiloxane containing 99.8 mol percent dimethylsiloxane units and 0.2 mol percent vinylmethylsiloxane units in addition to the endblocking units and having an average molecular weight of about 625,000, 60 parts reinforcing fume silica, 6 parts phenyl glycidyl ether and 1.5 parts benzoyl peroxide was prepared on a mill. A control mixture was identically prepared except the phenyl glycidyl ether was omitted. These mixtures were stored for four weeks. After storage, the mixture containing phenyl glycidyl ether could be softened and prepared for extrusion etc. by milling for four minutes but the control mixture required 17 minutes' milling. The mixtures were sheeted and vulcanized by heating 10 minutes at 155° C. The rubber so produced and containing phenyl glycidyl ether had a tensile strength of 65 kg./cm., elongation at break of 550% and tear resistance of 64 kg./cm. (ASTM D624–44, Die B). The control had a tensile strength of 70 kg./cm., elongation at break of 250% and tear strength of 7.5 kg./cm. when tested by identical methods.

*Example 3*

A mixture was prepared by milling 100 parts of a copolymeric siloxane containing 70 mol percent dimethylsiloxane units and 30 mol percent beta-cyanoethylmethylsiloxane units having an average molecular weight of about 375,000, 50 parts reinforcing fume silica, 10 parts diatomaceous earth, 1 part titanium dioxide, 5 parts iron oxide, 5 parts of the addition product of allyl glycidyl ether and symtrimethylcyclotrisiloxane and 2 parts tertiary butyl perbenzoate. After four weeks' storage this mixture had a softening time of six minutes on the mill. The mixture was vulcanized by heating to 150° C. for 10 minutes. The resulting rubber exhibited tensile strength of 55 kg./cm., elongation at break of 350% and tear strength of 40 kg./cm. (ASTM D624–44, Die B). A control prepared and stored exactly as above but without the epoxide additive had a softening time of 9 minutes after 4 weeks' storage and a tear strength of only 5 kg./cm. after vulcanization.

Example 4

Silicone rubbers having excellent tear strength were produced when the method of Example 1 was repeated employing 100 parts of a dimethylsiloxane of 200,000 cs. viscosity at 25° C., 100 parts of a copolymeric gum of 70 mol percent dimethylsiloxane units and 30 mol percent 3,3,3-trifluoropropylmethylsiloxane units, or a copolymeric gum of 50 mol percent dimethylsiloxane units, 40 mol percent phenylmethylsiloxane units, 9.95 mol percent ethyltolylsiloxane units and .05 mol percent vinyldimethylsiloxane units in place of the linear siloxane polymer in the epoxide containing mixtures of Example 1.

Example 5

Equivalent results were achieved when carbon black fillers having average particle size similar to the fume silicas (i.e., average particle size less than 1 micron and surface area of at least 100 m.²/gram) were substituted for the fume silica in Example 2.

Example 6

Equivalent results were achieved when the phenyl glycidyl ether of Example 2 was replaced with an equivalent proportion of each of the following allyl glycidyl ethers,

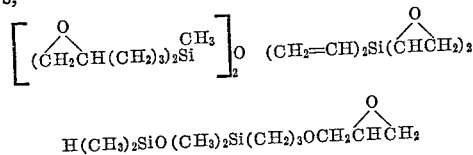

and polymers of the unit formula

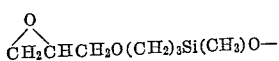

Example 7

A silicone rubber stock curing at room temperature in the presence of moisture and exhibiting excellent tear strength was obtained with the stock of Example 3 when a mixture of (1) ethylorthosilicate, methylpolysilicate or methylhydrogenpolysiloxane of 50 cs. viscosity at 25° C., and (2) stannous octoate, dibutyltindilaurate, dibutyltindimaleate, lead octoate, nickel hexoate, cobalt napththenate, ferric octoate, cadmium hexoate, plumbic tetraoctoate, zirconium octoate, antimony octoate, barium octoate, calcium octoate, titanium naphthenate, bismuth naphthenate, manganese octoate, dibutyltindiacetate, dibutyltin-di-2-ethyl hexoate, chromium octoate, or zinc naphthenate was substituted for the peroxide vulcanizing agent.

That which is claimed is:

1. A silicone rubber stock consisting essentially of (A) 100 parts by weight of a linear diorganosiloxane polymer wherein the organic substituents bonded to silicon are monovalent radicals selected from the group consisting of hydrocarbon radicals and halogenohydrocarbon radicals, said polymers having a viscosity of at least 50,000 cs. at 25° C., (B) 20 to 200 parts by weight of a reinforcing inorganic filler having a maximum average particle size of 1 micron and a minimum surface area of 100 square meters per gram, and (C) 0.5 to 10 parts by weight of an epoxide compound selected from the group consisting of
 (1) silanes of the formula $A_bR'_cSiX_{4-b-c}$ wherein each A is an organic radical bonded to silicon by C—Si linkage and containing one or more

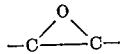

radicals, the remaining atoms in A being selected from the group consisting of carbon, hydrogen, carbon bonded halogen atoms and oxygen atoms in the form of ether linkages and hydroxyl groups, each $R'$ is selected from the group consisting of hydrogen atoms and monovalent hydrocarbon and monovalent halogenohydrocarbon radicals, each X is a substituent selected from the group consisting of hydroxyl radicals, monovalent hydrocarbonoxy radicals and monovalent halogeno hydrocarbonoxy radicals, $b$ is an integer from 1 to 4 inclusive, and $c$ is an integer from 0 to 3 inclusive;
 (2) siloxanes of the unit formula $$A_fR'_gSiO_{\frac{4-f-g}{2}}$$

wherein A and R' are as above defined, $f$ is an integer from 1 to 3 inclusive and $g$ is an integer from 0 to 2 inclusive;
 (3) reaction products of a polyhydric phenol and a poly-functional epichlorohydrin;
 (4) reaction products of a polyhydric phenol and a polyepoxide; and
 (5) ethers containing epoxide groups.

2. The stock of claim 1 further characterized in that the reinforcing filler is a silica.

3. The stock of claim 2 further characterized in that the epoxide compound is an epoxide ether.

4. The stock of claim 3 further characterized in that the epoxide ether is allyl glycidyl ether.

5. The stock of claim 2 further characterized in that the epoxide compound is an epoxide resin of the general formula

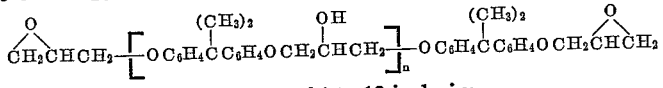

where $n$ has a value of 1 to 12 inclusive.

6. The stock of claim 1 further characterized in that it contains a mixture of a cross linking agent selected from the group consisting of alkylorthosilicates, alkylpolysilicates and alkylhydrogensiloxanes and a curing catalyst which is a monocarboxylic acid salt of a metal selected from the group consisting of Pb, Sn, Ni, Co, Fe, Cd, Cr, Zn, Mn, Zr, Sb, Ba, Ca, Ti and Bi.

7. The silicone rubber stock of claim 1 further characterized in that it contains an organic peroxide.

References Cited in the file of this patent

UNITED STATES PATENTS

| | | |
|---|---|---|
| 2,843,560 | Mika | July 15, 1958 |
| 2,883,397 | Bailey | Apr. 21, 1959 |

FOREIGN PATENTS

| | | |
|---|---|---|
| 1,061,321 | Germany | July 16, 1959 |
| 216,878 | Australia | Aug. 29, 1958 |